United States Patent [19]

Kim

[11] 4,324,776
[45] Apr. 13, 1982

[54] MID-TEMPERATURE H₂S REMOVAL PROCESS

[75] Inventor: Bang M. Kim, Schenectady, N.Y.

[73] Assignee: General Electric Company, Schenectady, N.Y.

[21] Appl. No.: 214,161

[22] Filed: Dec. 8, 1980

[51] Int. Cl.³ .................. B01D 53/34; C01C 1/242
[52] U.S. Cl. .................. 423/550; 423/220; 423/234; 423/238; 423/555; 423/561 R; 423/561 B; 423/571; 423/573.6; 423/592; 423/622; 423/632
[58] Field of Search ........... 423/220, 234, 225, 238, 423/550, 555, 571, 573, 561 R, 561 B, 592; 426/632, 622

[56] References Cited

U.S. PATENT DOCUMENTS

| | | | |
|---|---|---|---|
| 737,579 | 9/1903 | Burschell | 423/571 X |
| 1,597,964 | 8/1926 | Gludd | 423/220 |
| 4,062,663 | 12/1977 | Spevack | 55/259 X |
| 4,123,506 | 10/1978 | Spevack | 423/220 X |
| 4,150,953 | 3/1979 | Woodmansee | 48/200 X |
| 4,163,044 | 7/1979 | Woertz | 423/234 |
| 4,192,854 | 3/1980 | Harvey et al. | 423/220 |

FOREIGN PATENT DOCUMENTS 812428  4/1959  United Kingdom .......... 423/220

Primary Examiner—Earl C. Thomas
Attorney, Agent, or Firm—Lawrence D. Cutter; James C. Davis, Jr.; Marvin Snyder

[57] ABSTRACT

H₂S is removed from a stream of gas such as coal gas at a relatively elevated temperature (300°–400° F.) in a process which employs sulfates or hydroxides of nickel, iron, or zinc as sulfur absorbents. The absorbents are converted to metal sulfides during the absorption process and are regenerated by aeration. Acids produced during sulfur absorption and absorbent regeneration steps are neutralized through the addition of a base. In a preferred embodiment ammonia is also removed and elemental sulfur is produced during the process.

18 Claims, 3 Drawing Figures

MID-TEMPERATURE H₂S REMOVAL PROCESS

BACKGROUND OF THE INVENTION

This invention relates to a process for removing hydrogen sulfide from a gaseous stream such as coal gas, and more particularly to such a process which is effective over a mid-temperature range of approximately 300°–400° F.

Recent interest has been directed to integrated energy conversion plants which combine a coal gasification system, a cleanup system for generated coal gas, and a combustion gas turbine system for the production of power from the gas. In the cleanup system of such an integrated plant $H_2S$, $NH_3$ and other undesirable compounds contained in untreated coal gas (e.g. particulates, tar vapor, and vaporized alkali) are typically removed in a low temperature cleanup processes such as that depicted schematically in FIG. 1 and described in U.S. Pat. No. 4,150,953 (Woodmansee) which is incorporated herein by reference. Untreated coal gas exhausted from an associated gasifier system enters the cleanup system at approximately 1200° F. The majority of the alkali vapor, tar and particulates are removed in a quench/scrubber process in which coal gas is adiabatically saturated with water, dropping the gas temperature to approximately 330° F. The gas exhausted from the quench/scrubber process is then cooled to approximately 180° F. prior to H₂S removal since the H₂S removal processes typically employed in such systems require relatively low gas temperatures (i.e. less than 250° F.). After H₂S removal the gas is subsequently reheated and resaturated prior to its use as a fuel in an associated gas turbine.

Unfortunately, this required cooling and subsequent reheating of the gas to achieve effective H₂S removal introduces a thermodynamic inefficiency to the integrated energy conversion plant. Additionally, such cleanup systems are complex and capital intensive. Indeed, the capital costs of such a gas cleanup system may exceed that of an associated gasification system. Again, much of the complexity is due to the temperature limitation of conventional H₂S scrubbing processes which require gas cooling with resultant condensate handling, heat recovery and wastewater cleanup sub-processes.

Accordingly, it is a major objective of the present invention to provide a simplified sulfur removal process useful in an integrated coal gasifier/gas turbine power plant which is effective over a mid-temperature range compatible with the temperature of gas exhausted from a cooperating quench/scrubber system (i.e. approximately 300°–400° F). Certain currently available processes for the removal of H₂S may be operable over this mid-temperature range, however these processes present various application drawbacks. For example, one such proposed system employs $CuSO_4$ to precipitate hydrogen sulfide from geothermal steam at 350° F. ("Removing H₂S from Geothermal Steam", G. E. Coury and M. Vorum, CEP September 1977, p.93). The use of copper sulfate is intended to enable achievement of very low hydrogen sulfide concentrations which are typically required in geothermal steam cleanup systems. However, copper sulfate is expensive and the regeneration of spent absorbent (CuS) is a relatively complex and difficult process. Thus, it is another object of the present invention to provide a mid-temperature H₂S removal process which includes a simple absorbent regeneration step.

Additionally, certain gasification systems produce coal gas which requires additional scrubbing to remove ammonia therefrom in order to meet nitrogen oxides emission standards. However, the ammonia scrubbing processes currently available require a system separate from the H₂S removal system, thereby increasing both the complexity and the cost of the cleanup process. Thus, it is desirable and it is an object of the present invention to provide a gas cleanup process in which ammonia can be scrubbed from a coal gas simultaneously with hydrogen sulfide removal so as to obviate the need for a separate ammonia absorption system.

Furthermore, it is desirable to recover certain byproducts of a gas cleanup process. Thus, $(NH_4)_2SO_4$, which is useful as a fertilizer, is a desirable byproduct of a H₂S and $NH_3$ removal process. Elemental sulfur is also a desirable gas cleanup system byproduct which is conventionally extracted in a separate process such as in a Claus process. Accordingly, it is yet another object of the present invention to provide a gas cleanup process which affords a simplified and inexpensive recovery of byproducts from such a process. Such a cleanup system would enable the elimination of those process steps indicated by cross-hatching in FIG. 1, resulting in a significantly simplified cleanup process.

In addition to the foregoing, a system useful in coal gas cleanup should also selectively absorb hydrogen sulfide and ammonia from a gaseous stream while rejecting both carbon dioxide and water vapor which are typically contained therein. The retention of carbon dioxide and water in the fuel gas is important since they are effective expansion fluids when employed in an associated gas turbine and can increase the power output thereof. Additionally, absorbent material used in such a gas cleanup system is preferably inexpensive, non-corrosive and contains no alkali metal.

SUMMARY OF THE INVENTION

The above and other objects and benefits are achieved in a mid-temperature hydrogen sulfide removal process in which a hydrogen sulfide-containing gaseous stream is contacted at a temperature of between approximately 300° and 400° F. with absorbent compounds comprising sulfates or hydroxides of nickel, iron or zinc contained in an aqueous solution having a pH of between 2 and 12, and preferably between 4 and 10. As a result of this contacting hydrogen sulfide is removed from the gas to form sulfides of the aforementioned metals, with the absorbent compounds being subsequently regenerated through oxidation of the metal sulfide compounds by means of aeration as with air. The contacting and aeration steps may be performed separately, or they may be performed simultaneously in the same vessel. In a preferred embodiment the contacting is performed under acidic conditions resulting in a simultaneous removal of ammonia as $(NH_4)_2SO_4$ from the gaseous stream. In another preferred embodiment the regeneration of spent absorbent material is performed under acidic conditions to enable the recovery of elemental sulfur as a byproduct of the process. Aqueous solution containing the regenerated absorbent material is removed and recycled for subsequent hydrogen sulfide removal, with excess $H_2SO_4$ produced in the absorption/regeneration processes being neutralized through the addition of a base.

BRIEF DESCRIPTION OF THE DRAWINGS

The present invention may be better understood and appreciated through reference to the accompanying drawings in which.

DESCRIPTION OF THE INVENTION

Figure 1:
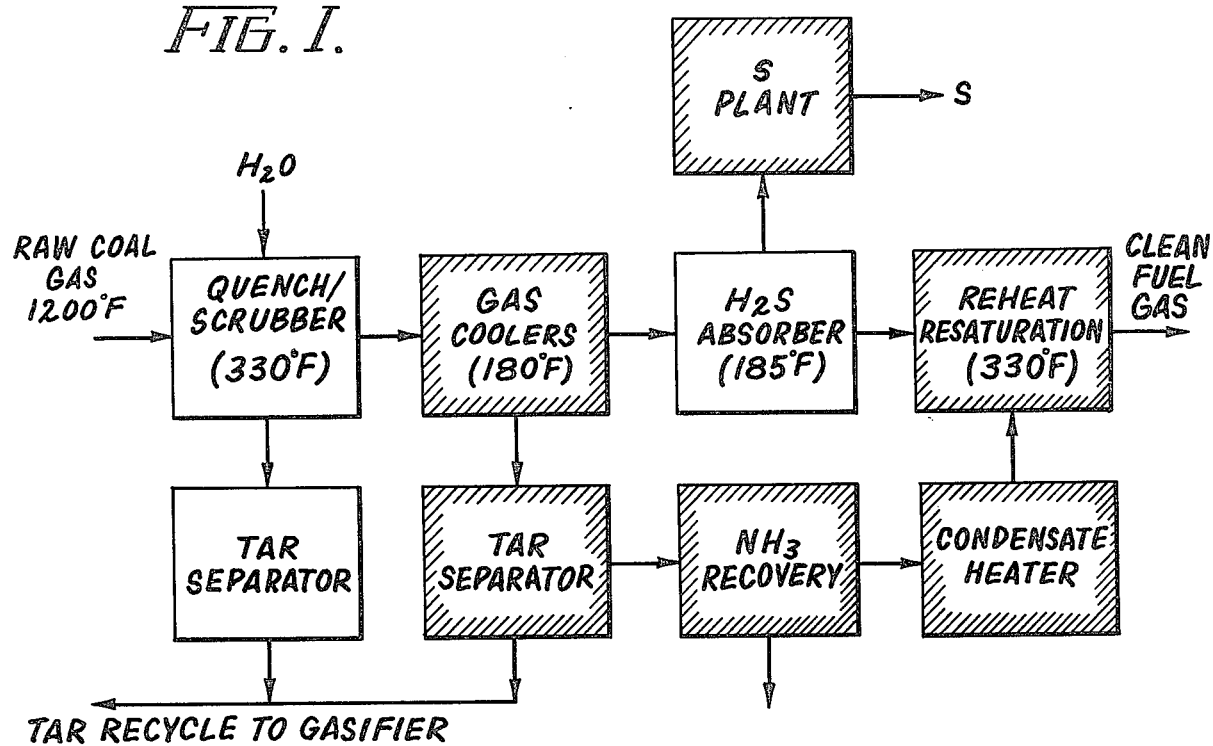
FIG. 1 is a schematic illustration of a conventional coal gas cleanup system depicting by cross-hatching the process steps eliminated through the practice of the present invention.

The practice of the present invention enables an effective removal of hydrogen sulfide from a stream of a gaseous material such as coal gas produced in gasifier in an integrated energy conversion system. The removal of hydrogen sulfide is performed at a mid-temperature range herein defined as between approximately 300° to 400° F. Ammonia may also be removed from a gaseous stream in this step simultaneously with the hydrogen sulfide upon maintenance of a suitable pH level as described hereinbelow. Similarly, elemental sulfur may be recovered as a direct byproduct of the subject hydrogen sulfide removal process along with gypsum and ammonium sulfate. Accordingly, the present invention provides a simplified hydrogen sulfide removal procedure which obviates the need for several sub-systems (indicated by cross-hatching in FIG. 1) typically required in conventional coal gas cleanup systems. Moreover, the present invention also enables a simplified regeneration of $H_2S$ absorbent materials. Of course, it is appreciated that the present invention may also be employed to remove hydrogen sulfide from gases other than coal gas, such as from a stream of geothermal steam.

Figure 2:
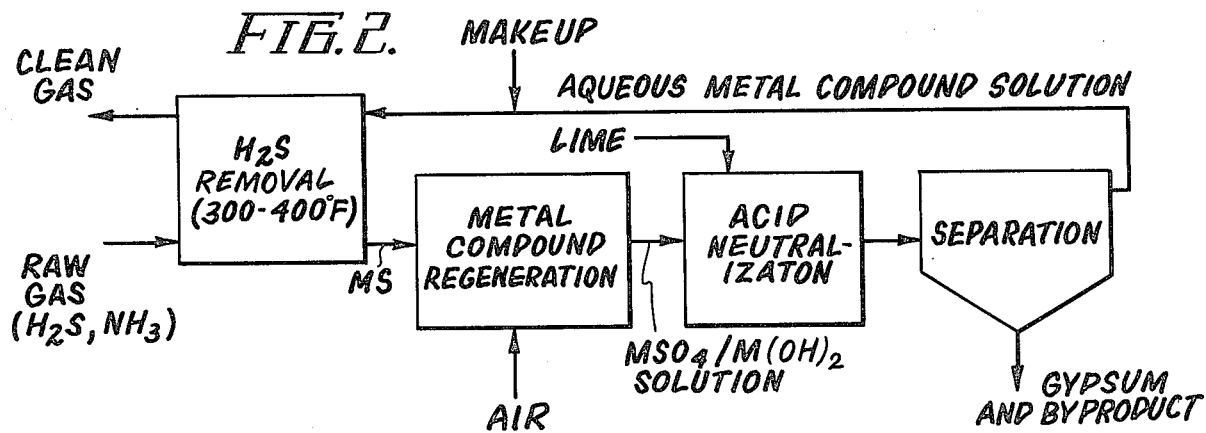
FIG. 2 is a schematic illustration of a hydrogen sulfide removal process according to the present invention.

As depicted schematically in FIG. 2, hydrogen sulfide removal according to the present invention requires contacting hydrogen sulfide contained in a given gaseous stream with reactive metal compounds comprising sulfates and/or hydroxides of nickel, iron, and/or zinc contained in stoichiometric excess in an aqueous solution. This contacting with $H_2S$ results in the formation of metal sulfides from the metal compounds. The contacting is performed within the mid-temperature range in a suitable conventional vessel. Exemplitive contacting vessels are described in interrelated U.S. Pat. Nos. 4,062,663 and 4,123,506 (Spevack) which are incorporated herein by reference.

During $H_2S$ removal the pH of the aqueous solution contacted with the gaseous stream is maintained at greater than 2 so as to enable sufficient pH-dependent hydrogen sulfide removal and associated metal sulfide formation based on present emissions standards for sulfur oxides. More preferably, the pH of the aqueous solution is maintained at greater than 4. Similarly, the pH of the aqueous solution is maintained at less than 12 in order to prevent corrosion of the vessel, and to prevent excessive $CO_2$ absorption when processing a gaseous stream such as coal gas. More preferably, the pH is maintained at less than 10. Within the preferred pH range of 4 to 10, there are distinct advantages obtainable through maintenance of slightly acidic or basic aqueous solutions in the contacting step.

For example, in a process in which the aqueous solution is maintained in an acidic condition (pH of 2 to 7) ammonia may also be removed from an influent gaseous stream. In this embodiment, the gaseous stream is contacted in the mid-temperature range with an aqueous solution containing sulfates of nickel, iron and/or zinc. The metal sulfates react with hydrogen sulfide in the gaseous stream to form metal sulfides and $H_2SO_4$. Ammonia contained in the influent stream reacts with the $H_2SO_4$ to form $(NH_4)_2SO_4$. Thus, ammonia is simultaneously removed in the present invention, obviating the requirement of a separate ammonia removal step. Additionally, the formed $(NH_4)_2SO_4$ is a recoverable byproduct which is useful as fertilizer.

In an alternative embodiment the aqueous solution is maintained in a basic condition (pH of 7 to 12) during the contacting step and the reactive metal compounds provided therein are hydroxides of nickel, iron and/or zinc. As in the acidic case, the metal hydroxides react with hydrogen sulfide during contacting to form metal sulfides and water. However, ammonia is not removed from a gaseous stream under basic conditions due to the pH-dependent absorption of $NH_3$.

As depicted in FIG. 2, the present invention also enables a greatly facilitated regeneration of reactive metal sulfate or hydroxide compounds from metal sulfides formed as a result of $H_2S$ removal in a prior contacting step. More particularly, regeneration according to the present invention is effected through oxidation by a simple aeration (i.e. charging) of a resulting metal sulfide solution with at least a stoichiometric quantity of an oxygen-containing gas such as air. This aeration may be conducted at the mid-temperature range, thereby improving the thermal efficiency of the process.

Figure 3:
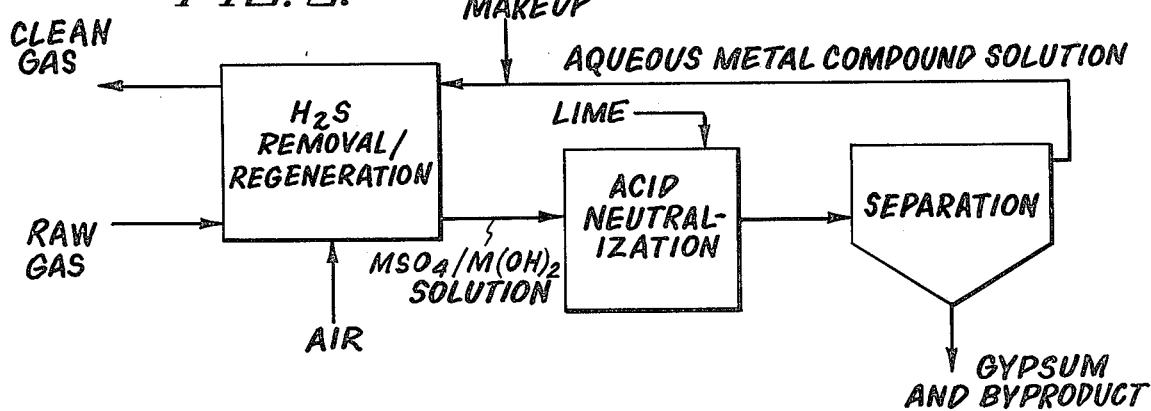
FIG. 3 is a schematic representation of a process as in FIG. 2 in which associated contacting and aeration steps are performed in the same vessel.

In a single vessel process depicted in FIG. 3, the aeration step may be performed simultaneously with and in the same vessel as the contacting step described above. In this manner facility costs may be minimized. However, simultaneous performance of the contacting and aeration steps in the same vessel may result in a potentially undesirable transfer of excess air (or other aerating gas) to a resulting effluent gas stream. For example, when processing coal gas the addition of excess air to an effluent cleaned fuel gas stream will degrade the heating value thereof while also presenting a potentially hazardous oxidation reaction in the fuel gas during transfer to an associated gas turbine. Accordingly, the aforementioned single vessel process is more applicable to the removal of $H_2S$ from other types of gaseous streams, such as from geothermal steam, in which the addition of excess air does not significantly detract from an effluent stream. However, the single vessel process may be advantageously employed with an influent coal gas stream if a stoichiometric quantity of oxygen is employed in the aeration step.

During regeneration in the aeration step a resulting solution from an associated contacting step is maintained at a pH of between 2 and 12 during the aeration thereof with an oxygen containing gas. This aeration step is preferably conducted under acidic conditions if the contacting step is also acidic. However, the aeration step may be basic or acidic if the contacting step is conducted under basic conditions. pH levels during aeration of approximately less than 2 will result in undesirable hydrogen sulfide reformation, while pH levels of greater than approximately 12 result in vessel corrosion and inefficient use of excess basic material. When an aeration step is conducted under basic conditions the metal sulfide in the resulting solution is oxidized by aeration and is regenerated into metal hydroxide. This metal hydroxide may be subsequently recycled for use in an aqueous solution in a contacting step. However, if the aeration step is conducted under acidic conditions, elemental sulfur is also formed during aeration and may be directly retrieved in the present process.

More specifically, if an aeration step is performed under acidic conditions metal sulfides in a resulting solution from an associated contacting step are normally oxidized to form regenerated metal sulfates. However, if reactive iron compounds are initially employed in an aqueous solution for a contacting step, iron hydroxide is also formed during aeration. The formed iron hydroxide is stable under acidic conditions, and may be recycled in an aqueous solution for additional contacting steps. When the metal employed is nickel and/or iron, elemental sulfur in a liquid phase is also produced during aeration under acidic conditions. The preferred embodiment for producing elemental sulfur includes simultaneously conducted contacting and aeration steps performed under acidic conditions in the same vessel, as depicted in FIG. 3. The formed elemental sulfur is molten and stable under acidic conditions in the mid-temperature range and is recoverable by conventional gravity separation techniques.

Although the metal compounds regenerated by aeration may be directly recycled for $H_2S$ removal in additional contacting steps, aqueous solution containing the regenerated compounds must first be processed to establish a suitable pH for recycling and to remove byproducts such as sulfur and $(NH_4)_2SO_4$. Accordingly, the practice of the present invention as depicted in FIGS. 2 and 3 includes neutralization and separation steps. pH adjustment is required to at least partially neutralize sulfuric acid formed in the preceding steps. Accordingly, the neutralization step is included in which a base is added to the solution either before or after the aeration step to obtain a desired aqueous solution pH within the aforementioned pH limits of 2 to 12, and more preferably from 4 to 10. In a two-vessel embodiment such as depicted in FIG. 2 which includes a basic contacting step and an acidic aeration step, the neutralization step also acts to convert regenerated metal sulfates into metal hydroxides prior to their being recycled for additional contacting with a gaseous stream.

In a preferred neutralization step the base employed is lime. This results in the formation of calcium sulfate (gypsum) crystals. These crystals are subsequently removed from the solution as by conventional gravity separation techniques. Similarly, molten elemental sulfur and $(NH_4)_2SO_4$ crystals formed as noted above during acidic aeration and contacting steps respectively are also removed by known gravity and/or particulate size separation techniques. The resulting pH-adjusted and byproduct-depleted aqueous solution is then recycled to a subsequent contacting step along with a sufficient concentration of appropriate metal sulfates or hydroxides and any makeup solution which may be required.

The effectiveness of the subject hydrogen sulfide removal process may be better appreciated by the following experimental test results:

EXAMPLE I

The removal of $H_2S$ from a gaseous stream and corresponding conversion of reactant metal compounds to metal sulfides was demonstrated by passing a 1% $H_2S$ gas stream through a 0.1 M $ZnSO_4$ aqueous solution at 150° C.(300° F.) and 150 psi until the absorption of $H_2S$ terminated. Final solution pH was 1.9, with 0.299 g. of ZnS produced reflecting a 61% conversion of $ZnSO_4$ to ZnS.

EXAMPLE II

In a test similar to Example 1, the effect of acid neutralization was demonstrated by including 1.67% $NH_3$ with 0.83% $H_2S$ in an influent gas stream. The stream was passed through a 0.1 M $ZnSO_4$ solution as above until $H_2S$ absorption terminated. Final solution pH was 9.4, with 0.466 g. of ZnS and 0.432 g. of $(NH_4)_2SO_4$ produced, reflecting a 96% conversion of $ZnSO_4$ to ZnS.

EXAMPLE III

Regeneration of reactive metal compounds by aeration was demonstrated in a test in which 100 ml of 0.1 M $NiSO_4$ was reacted with NaOH to a pH of 9 to produce reactive $Ni(OH)_2$ compound in a slurry form. The $Ni(OH)_2$ was buffered at pH 9 with potassium phosphate and sodium borate and was placed in an autoclave at 300° F. and 150 psi. 1% $H_2S$ gas was passed through the slurry at 5 ml/sec. for 10 min., producing black NiS precipitate. Air was then passed through the slurry for 30 min. at 5 ml/sec., producing a greenish white $Ni(OH)_2$ precipitate. The production of NiS and regeneration of $Ni(OH)_2$ could be repeated three times without any noticeable changes.

EXAMPLE IV

The production of an elemental sulfur byproduct was demonstrated in a test in which 100 ml of 0.1 M $FeSO_4$ was adjusted to pH 5 with NaOH to produce $Fe(OH)_2$. A slurry containing the $Fe(OH)_2$ was added to an autoclave maintained at 300° F. and 150 psi. 1% $H_2S$ and air were each passed simultaneously at 2 ml/sec. through the slurry for two hours. The final pH was 1.7, and sulfur particles were detected in the slurry.

Accordingly, the subject invention provides for hydrogen sulfide removal at a mid-temperature range, thereby obviating the need for complex temperature modification equipment found in conventional integrated coal gasification plant cleanup systems. Correspondingly, the thermodynamic efficiency penalties associated with such systems are also avoided. Additionally, the present invention includes a greatly simplified regeneration step over that employed in similar processes. Moreover, carbon dioxide initially present in a coal gas is not readily absorbed in the described hydrogen sulfide absorption process. Finally, the reactive materials employed (i.e. the metal compounds) are inexpensive and easy to obtain. As regards the selection of metals employed in the present process, Ni is a preferred choice. In contrast, Zn exhibits a lower capacity for regeneration an accordingly is less preferred.

The above-described embodiments of this invention are intended to be exemplitive only and not limiting, and it will be appreciated from the foregoing by those skilled in the art that many substitutions, alterations and changes may be made to the disclosed structure without departing from the fundamental concept of the invention.

What is claimed as new and desired to be secured by Letters Patent of the United States is:

1. A process for removing hydrogen sulfide from a gaseous stream comprising the steps of:

(a) providing an aqueous solution at a pH of between 2 and 12, said solution containing at least one reactive metal compound therein the metal of which is selected from the group consisting of nickel, iron and zinc;

(b) removing hydrogen sulfide from said gaseous stream by contacting the same with said aqueous solution at a temperature of between 300° and 400° F. in a closed vessel to form a resulting solution having a metal sulfide reaction product therein and a resulting gaseous stream depleted in hydrogen sulfide;

(c) removing said resulting gaseous stream from said contact;

(d) regenerating said reactive metal compound provided in the aqueous solution in step (a) from said metal sulfide reaction product by aerating at least a portion of said resulting solution with an oxygen-containing gas while maintaining the pH level of said resulting solution at between approximately 2 to 12.

2. A process as in claim 1 wherein the aqueous solution referred to in step (a) is provided at a pH of between approximately 2 and 7.

3. A process as in claim 1 wherein the aqueous solution referred to in step (a) is provided at a pH of between approximately 4 and 7.

4. A process as in claim 2 wherein the reactive metal compound referred to in step (a) comprises a sulfate.

5. A process as in claim 2 wherein the pH of said resulting solution in step (d) is maintained between approximately 2 and 7 during said aeration.

6. A process as in claim 5 wherein the metal in said reactive metal compound is selected from the group consisting of nickel and iron and wherein a sulfur reaction product is formed during the aeration of said resulting solution in step (d), which process further comprises;

(e) removing at least a portion of said sulfur reaction product from the aerated solution.

7. A process as in claim 2 wherein said gaseous stream contacted in step (b) also contains ammonia, which process further comprises;

(f) simultaneously with step (b), extracting ammonia from said gaseous stream by contacting said stream with said aqueous solution at a temperature of approximately 300° to 400° F. so as to form $(NH_4)_2SO_4$ in said resulting aqueous solution whereby said resulting gaseous stream is also depicted in ammonia; and (g) removing at least a portion of said $(NH_4)_2SO_4$ from said resulting solution.

8. A process as in claim 2 wherein said gaseous stream contacted in step (b) also contains ammonia, which process further comprises;

(f) simultaneously with step (b), extracting ammonia from said gaseous stream by contacting said stream with said aqueous solution at a temperature of approximately 300° to 400° F. so as to form $(NH_4)_2SO_4$ in said resulting aqueous solution whereby said resulting gaseous stream is also depleted in ammonia; and (g) removing at least a portion of said $(NH_4)_2SO_4$ from the solution aerated in step (d).

9. A process as in claim 1 wherein the aqueous solution referred to in step (a) is provided at a pH of between 7 and 12.

10. A process as in claim 9 wherein the reactive metal compound referred to in step (a) comprises a hydroxide.

11. A process as in claim 9 wherein the aqueous solution referred to in step (a) is provided at a pH of between approximately 7 and 10.

12. A process as in claim 9 wherein the pH of said resulting solution aerated in step (d) is maintained between approximately 7 and 12 during said aeration.

13. A process as in claim 10 wherein the pH of said resulting solution aerated in step (d) is maintained between approximately 2 and 7 during said aeration, and wherein step (d) further comprises adjusting the pH of at least a portion of the aerated solution to between approximately 7 and 12 by the addition of a base so as to regenerate said reactive metal hydroxide.

14. A process as in claim 1 wherein the metal in said reactive metal compound is nickel.

15. A process as in claim 1 wherein the metal in said reactive metal compound is iron.

16. A process as in claim 1 wherein the metal in said reactive metal compound is zinc.

17. A process as in claim 1 wherein steps (b) and (d) are preformed in the same vessel at substantially the same time.

18. A process as in claim 1 wherein steps (b) and (d) are performed in the same vessel and step (b) is initiated before and continues during step (d).

* * * * *